United States Patent
Yamazaki et al.

(10) Patent No.: US 12,424,385 B2
(45) Date of Patent: Sep. 23, 2025

(54) FILM CAPACITOR, FILM, AND METALLIZED FILM

(71) Applicant: Murata Manufacturing Co., Ltd., Nagaokakyo (JP)

(72) Inventors: Kazuto Yamazaki, Nagaokakyo (JP); Tomoki Inakura, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 324 days.

(21) Appl. No.: 18/295,588

(22) Filed: Apr. 4, 2023

(65) Prior Publication Data

US 2023/0245825 A1    Aug. 3, 2023

Related U.S. Application Data

(63) Continuation of application No. PCT/JP2021/036978, filed on Oct. 6, 2021.

(30) Foreign Application Priority Data

Oct. 9, 2020 (JP) .................. 2020-171217

(51) Int. Cl.
*H01G 4/14* (2006.01)
*H01B 3/30* (2006.01)
(Continued)

(52) U.S. Cl.
CPC .................. *H01G 4/14* (2013.01); *H01B 5/14* (2013.01); *H01B 17/56* (2013.01); *H01G 4/012* (2013.01);
(Continued)

(58) Field of Classification Search
CPC ............ H01G 4/14; H01G 4/012; H01G 4/32; H01G 4/008; H01B 5/14; H01B 17/56; H01B 3/302
See application file for complete search history.

(56) References Cited

U.S. PATENT DOCUMENTS 5,581,435 A    12/1996   Kinoshita et al.
6,724,610 B1    4/2004   Eriksson et al.
(Continued)

FOREIGN PATENT DOCUMENTS

CN    111149180 A    5/2020
JP    H05251266 A    9/1993
(Continued)

OTHER PUBLICATIONS

International Search Report in PCT/JP2021/036969, mailed Dec. 28, 2021, 3 pages.
(Continued)

*Primary Examiner* — Michael P McFadden
(74) *Attorney, Agent, or Firm* — ArentFox Schiff LLP

(57) ABSTRACT

A film capacitor that includes: a wound body in which a dielectric film and a metal layer are wound, the dielectric film including a cured product of a first organic material having a hydroxy group and a second organic material that is an aromatic compound having an isocyanate group, the dielectric film including a first main surface and a second main surface opposed to each other in a thickness direction, the metal layer being disposed at least on the first main surface of the dielectric film. The first main surface of the dielectric film includes a plurality of protrusions having the second organic material. In an area range of 100 μm by 140 μm of the first main surface of the dielectric film, a skewness of the first main surface of the dielectric film is 0.782 to 14.3.

16 Claims, 4 Drawing Sheets

(51) Int. Cl.
*H01B 5/14* (2006.01)
*H01B 17/56* (2006.01)
*H01G 4/008* (2006.01)
*H01G 4/012* (2006.01)
*H01G 4/32* (2006.01)

(52) U.S. Cl.
CPC ............. *H01G 4/32* (2013.01); *H01B 3/302* (2013.01); *H01G 4/008* (2013.01)

(56) References Cited

U.S. PATENT DOCUMENTS

| | | | |
|---|---|---|---|
| 11,295,898 | B2 | 4/2022 | Inakura et al. |
| 2005/0257740 | A1* | 11/2005 | Hoshino ................. C04B 41/52 118/500 |
| 2008/0102247 | A1 | 5/2008 | Matsuo et al. |
| 2008/0310075 | A1 | 12/2008 | Takeoka et al. |
| 2013/0010400 | A1 | 1/2013 | McConnell et al. |
| 2014/0016244 | A1 | 1/2014 | Manno et al. |
| 2014/0368970 | A1 | 12/2014 | Ichikawa et al. |
| 2016/0027579 | A1* | 1/2016 | Kurachi ................. H01G 4/224 361/321.1 |
| 2016/0380259 | A1* | 12/2016 | Yang ....................... H01M 4/80 429/223 |
| 2017/0025324 | A1* | 1/2017 | Yamaki ............. H01L 23/49822 |
| 2017/0229243 | A1 | 8/2017 | Nakata et al. |
| 2017/0330688 | A1* | 11/2017 | Lim ....................... H01G 4/306 |
| 2019/0103220 | A1* | 4/2019 | Hiraoka ................. H01G 4/005 |
| 2019/0172642 | A1* | 6/2019 | Yamazaki ................ H01G 4/18 |
| 2020/0211772 | A1 | 7/2020 | Ichikawa et al. |
| 2020/0211779 | A1* | 7/2020 | Inakura .................. H01G 4/015 |
| 2021/0241974 | A1* | 8/2021 | Yamazaki ........... H01G 4/1218 |
| 2021/0257164 | A1* | 8/2021 | Hiraoka ................. H05K 1/162 |
| 2021/0358693 | A1 | 11/2021 | Ozasa et al. |
| 2022/0130611 | A1 | 4/2022 | Jogan et al. |

FOREIGN PATENT DOCUMENTS

| | | |
|---|---|---|
| JP | 2001002805 A | 1/2001 |
| JP | 2004363431 A | 12/2004 |
| JP | 2011251493 A | 12/2011 |
| JP | 2019172921 A | 10/2019 |
| WO | 2013128726 A1 | 9/2013 |
| WO | 2017175511 A1 | 10/2017 |
| WO | 2019097751 A1 | 5/2019 |
| WO | 2020161984 A1 | 8/2020 |

OTHER PUBLICATIONS

International Search Report in PCT/JP2021/036978, mailed Dec. 28, 2021, 3 pages.
International Search Report in PCT/JP2021/036981, mailed Dec. 28, 2021, 3 pages.

* cited by examiner

FILM CAPACITOR, FILM, AND METALLIZED FILM

CROSS REFERENCE TO RELATED APPLICATIONS

The present application is a continuation of International application No. PCT/JP2021/036978, filed Oct. 6, 2021, which claims priority to Japanese Patent Application No. 2020-171217, filed Oct. 9, 2020, the entire contents of each of which are incorporated herein by reference.

FIELD OF THE INVENTION

The present invention relates to a film capacitor, a film, and a metallized film.

BACKGROUND OF THE INVENTION

As a capacitor, a film capacitor having a structure including a flexible film as dielectric film with a first metal layer and a second metal layer opposed to each other across the film is known. The film capacitor is produced, for example, by winding or laminating a film with a first metal layer and a film with a second metal layer.

In production of a film capacitor through fabrication of a wound body by winding a film, the wound body may be pressed for height reduction of the film capacitor. On this occasion, a film having good slidability allows the wound body to be uniformly pressed, so that the height reduction of the film capacitor can be easily achieved.

On the other hand, it is said that formation of a gap between the overlapping films in a wound body allows decomposition gas from the film to easily scatter from inside the film capacitor in dielectric breakdown, so that a so-called self-healing function works to recover the insulating state of the film. In fabrication of a wound body, a film having good slidability allows a gap to be uniformly formed between the overlapping films, so that the self-healing function works easily.

Therefore, in order to enhance the pressing properties against a film capacitor and self-healing properties of a film capacitor, slidability is imparted to a film in some cases. As a method for imparting slidability to a film, a method of blending an organic filler into a base resin is disclosed in Patent Literature 1. As described above, slidability is conventionally imparted to a film by blending a filler into a resin to roughen the film surface.

Patent Literature 1: JP 2011-251493A

SUMMARY OF THE INVENTION

In a conventional film with a filler blended into a resin, however, an electric field tends to be concentrated in the vicinity of the filler due to difference in dielectric constant between the resin and the filler, which results in lowering of the dielectric breakdown voltage. The conventional film, therefore, has much room for improvement in terms of compatibility between the slidability and the voltage resistance.

On the other hand, roughening film surface allows a gap to be easily formed between overlapping films in production of a film capacitor by winding the film. It is therefore presumed that roughening film surface makes the self-healing function work easily when dielectric breakdown occurs.

However, in the case where the roughened portion of the film surface has a low hardness, a gap is hardly formed between the overlapping films in production of a film capacitor through winding of the film, because the roughened portion of the film is easily collapsed. As a result, the decomposition gas from the film hardly scatters from inside the film capacitor when dielectric breakdown occurs, so that the self-healing function hardly works.

The present invention has been made to solve the problem, and an object thereof is to provide a film capacitor including a dielectric film excellent in slidability and voltage resistance, capable of imparting excellent pressing properties and self-healing properties. Further, another object of the present invention is to provide a film usable as dielectric film for the film capacitator. Further, another object of the present invention is to provide a metallized film usable for the film capacitor.

A film capacitor of the present invention in a first aspect includes a wound body in which a dielectric film and a metal layer are wound, the dielectric film including a cured product of a first organic material having a hydroxy group and a second organic material that is an aromatic compound having an isocyanate group, the dielectric film including a first main surface and a second main surface opposed to each other in a thickness direction, the metal layer being disposed at least on the first main surface of the dielectric film, wherein the first main surface of the dielectric film includes a plurality of protrusions having the second organic material, and in an area range of 100 μm by 140 μm of the first main surface of the dielectric film, a skewness of the first main surface of the dielectric film is 0.782 to 14.3.

A film capacitor of the present invention in a second aspect includes a wound body in which a dielectric film and a metal layer are wound, the dielectric film including a cured product of a first organic material having a hydroxy group and a second organic material that is an aromatic compound having an isocyanate group, the dielectric film including a first main surface and a second main surface opposed to each other in a thickness direction, the metal layer being disposed at least on the first main surface of the dielectric film, wherein the first main surface of the dielectric film includes a plurality of protrusions having the second organic material, a surface of the metal layer on an opposite side of the first main surface of the dielectric film includes a plurality of protruding parts coinciding with the plurality of protrusions, and in an area range of 100 μm by 140 μm of the surface of the metal layer, a skewness of the surface of the metal layer is 0.562 to 13.9.

A film of the present invention includes a cured product of a first organic material having a hydroxy group and a second organic material that is an aromatic compound having an isocyanate group, and includes a first main surface and a second main surface opposed to each other in a thickness direction, wherein the first main surface includes a plurality of protrusions having the second organic material, and in an area range of 100 μm by 140 μm of the first main surface, a skewness of the first main surface is 0.782 to 14.3.

A metallized film of the present invention includes: a film including a cured product of a first organic material having a hydroxy group and a second organic material that is an aromatic compound having an isocyanate group, and including a first main surface and a second main surface opposed to each other in a thickness direction; and a metal layer disposed at least on the first main surface of the film, wherein the first main surface of the film includes a plurality of protrusions having the second organic material, a surface of the metal layer on an opposite side of the first main surface of the film includes a plurality of protruding parts coinciding with the plurality of protrusions, and in an area range of 100 μm by 140 μm of the surface of the metal layer, a skewness of the surface of the metal layer is 0.562 to 13.9.

According to the present invention, a film capacitor including a dielectric film excellent in slidability and voltage resistance, capable of imparting excellent pressing properties and self-healing properties can be provided. Further, according to the present invention, a film usable as dielectric film for the film capacitor can be provided. Further, according to the present invention, a metallized film usable for the film capacitor can be provided.

DETAILED DESCRIPTION OF THE PREFERRED EMBODIMENTS

The film capacitor of the present invention, the film of the present invention, and the metallized film of the present invention will be described as follows. The present invention is not limited to the following constitution, and may be appropriately modified in a range not deviating from the gist of the present invention. Further, the present invention also includes a combination of individual preferable constitutions to be described below.

The film capacitor of the present invention in the first aspect and the second aspect includes a wound body in which a dielectric film and a metal layer are wound, the dielectric film including a cured product of a first organic material having a hydroxy group and a second organic material that is an aromatic compound having an isocyanate group, the dielectric film including a first main surface and a second main surface opposed to each other in a thickness direction, the metal layer being disposed at least on the first main surface of the dielectric film.

In the case where the film capacitors of the present invention in the first aspect and the second aspect are not particularly distinguished, a term "film capacitor of the present invention" is simply used.

In the following, as an example of the film capacitor of the present invention, a so-called wound-type film capacitor in which a laminate of a metallized film including a metal layer disposed at least on one main surface of a dielectric film is wound will be described.

Figure 1:
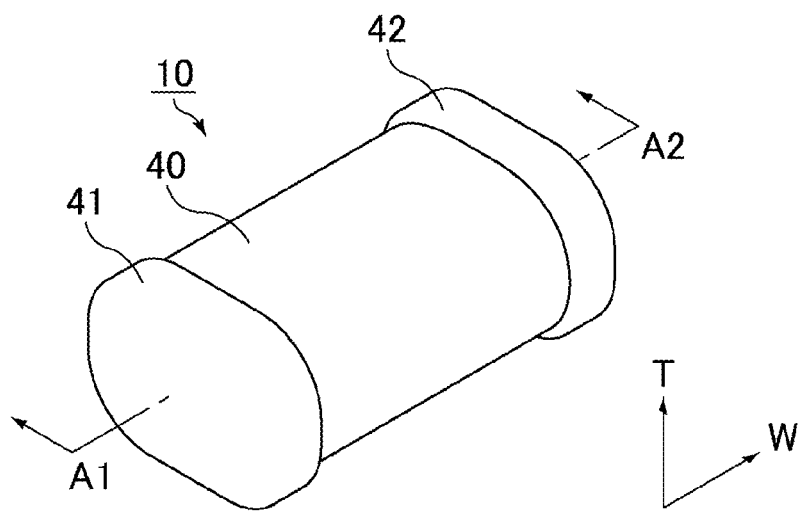
FIG. 1 is a schematic perspective view showing an example of a film capacitator of the present invention.
Figure 2:
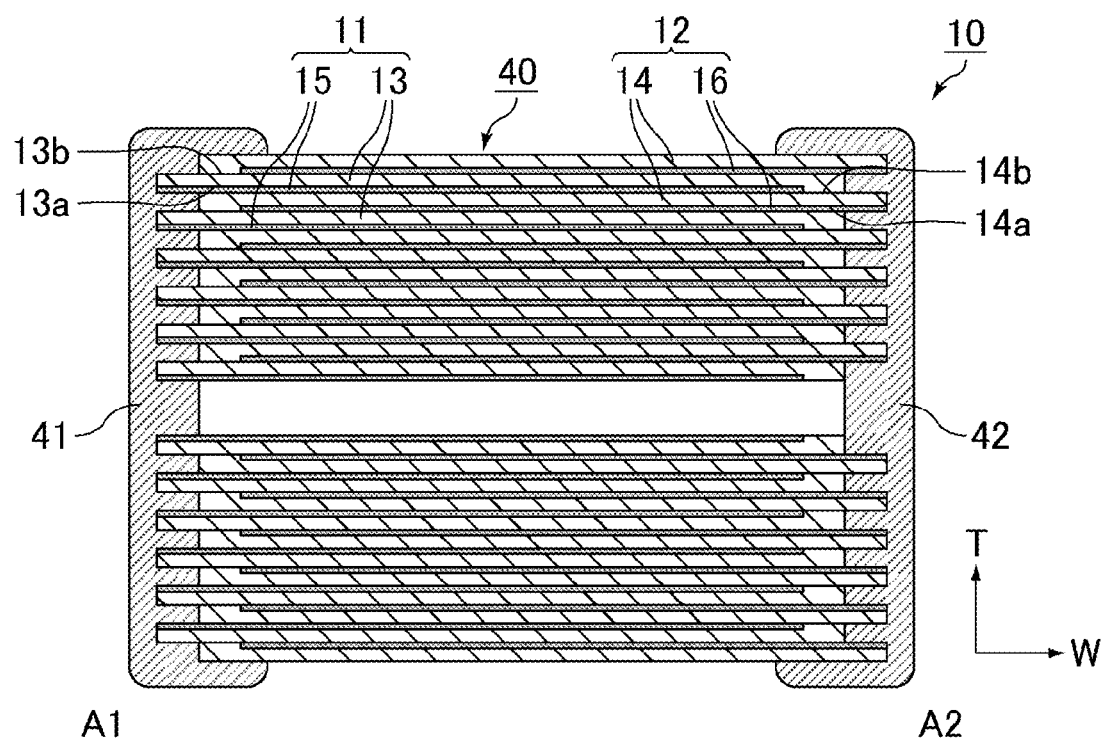
FIG. 2 is a schematic cross-sectional view showing a portion corresponding to a line segment A1-A2 in FIG. 1.
Figure 3:
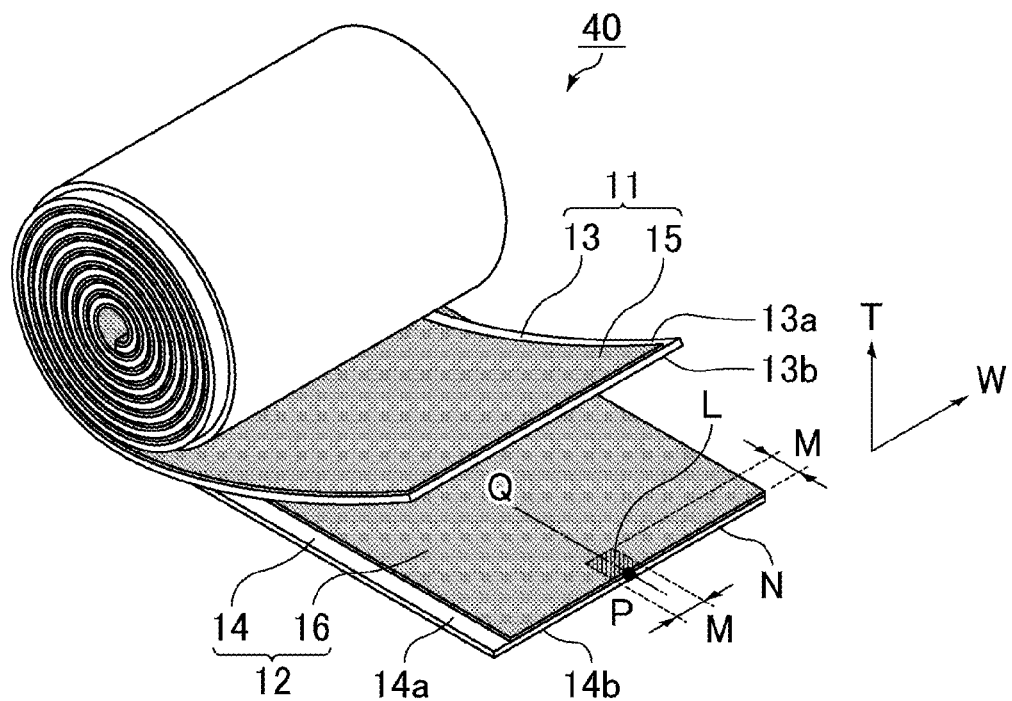
FIG. 3 is a perspective schematic view showing an example of a wound body in FIG. 1 and FIG. 2.

FIG. 1 is a schematic perspective view showing an example of a film capacitator of the present invention. FIG. 2 is a schematic cross-sectional view showing a portion corresponding to a line segment A1-A2 in FIG. 1. FIG. 3 is a perspective schematic view showing an example of a wound body in FIG. 1 and FIG. 2.

In the present specification, as shown in FIG. 1, FIG. 2 and FIG. 3, a lamination direction and a width direction of a film capacitor are directions specified by T and W, respectively. Although it can be said that a wound-type film capacitor has a plurality of lamination directions, the direction is specified by T in the present specification. The lamination direction T and the width direction W are orthogonal to each other.

As shown in FIG. 1 and FIG. 2, a film capacitor 10 includes a wound body 40, a first external electrode 41 disposed on one end face of the wound body 40, and a second external electrode 42 disposed on another end face of the wound body 40. Both of the end faces of the wound body 40 are opposed to each other in the width direction W.

As shown in FIG. 2 and FIG. 3, the wound body 40 is a wound body in which a first metallized film 11 and a second metallized film 12 laminated in the lamination direction T are wound. In other words, the film capacitor 10 is a wound-type film capacitor including the wound body 40.

In the film capacitor 10, it is preferable that the wound body 40 have a flat cross-section perpendicular to a scroll axis direction of the wound body from the viewpoint of height reduction of the film capacitor 10. More specifically, it is preferable that the wound body 40 be pressed to have a flat cross section such as ellipse or oval, so that the cross section of the wound body 40 has a smaller thickness than that of true circle.

It can be checked whether the wound body has been pressed to have a flat cross section by, for example, presence of a press mark on the wound body.

The film capacitor 10 may have a winding axis in a cylindrical shape. The winding axis is disposed on the central axis of the first metallized film 11 and the second metallized film 12 in a wound state, functioning as scroll axis when the first metallized film 11 and the second metallized film 12 are wound.

The first metallized film 11 includes a first dielectric film 13 and a first metal layer 15.

The first dielectric film 13 includes a first main surface 13a and a second main surface 13b opposed to each other in the thickness direction (lamination direction T in FIG. 2).

The first metal layer 15 is disposed on the first main surface 13a of the first dielectric film 13. More specifically, the first metal layer 15 is disposed to reach one side edge of the first dielectric film 13 but not to reach another side edge of the first dielectric film 13 in the width direction W.

The second metallized film 12 includes a second dielectric film 14 and a second metal layer 16.

The second dielectric film 14 includes a first main surface 14a and a second main surface 14b opposed to each other in the thickness direction (lamination direction T in FIG. 2).

The second metal layer 16 is disposed on the first main surface 14a of the second dielectric film 14. More specifically, the second metal layer 16 is disposed not to reach one side edge of the second dielectric film 14 but to reach another side edge of the second dielectric film 14 in the width direction W.

In the wound body 40, the neighboring first metallized film 11 and second metallized film 12 are displaced in the width direction W, such that the end of the first metal layer 15 which reaches the side edge of the first dielectric film 13 is exposed to one end face of the wound body 40 and the end of the second metal layer 16 which reaches the side edge of the second dielectric film 14 is exposed to another end face of the wound body 40.

The wound body 40 includes the first metallized film 11 and the second metallized film 12 laminated in the lamination direction T and wound, and therefore can also be called a wound body in which the first metal layer 15, the first dielectric film 13, the second metal layer 16, and the second dielectric film 14 are sequentially laminated in the lamination direction T and wound.

In the wound body 40, the first metallized film 11 and the second metallized film 12 laminated in the lamination direction T are wound, such that the first metallized film 11 is disposed inside the second metallized film 12, the first metal layer 15 is disposed inside the first dielectric film 13, and the second metal layer 16 is disposed inside the second dielectric film 14. In other words, the first metal layer 15 and the second metal layer 16 are opposed to each other across the first dielectric film 13 or the second dielectric film 14.

The second metal layer 16 may be disposed on the second main surface 13b of the first dielectric film 13, instead of the first main surface 14a of the second dielectric film 14. In this case, in the wound body 40, a metallized film including the first metal layer 15 disposed on the first main surface 13a of the first dielectric film 13 and the second metal layer 16 disposed on the second main surface 13b of the first dielectric film 13 and the second dielectric film 14 laminated in the lamination direction T are wound.

It is preferable that each of the first metal layer 15 and the second metal layer 16 include a fuse part.

Figure 4:
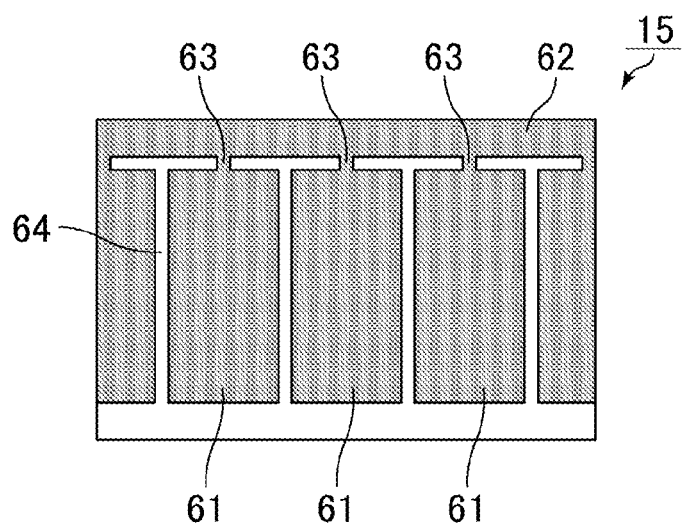
FIG. 4 is a schematic plan view showing an example of a metal layer including a fuse part.

FIG. 4 is a schematic plan view showing an example of a metal layer including a fuse part.

As shown in FIG. 4, the first metal layer 15 includes a plurality of split electrode parts 61, an electrode part 62 and fuse parts 63.

The split electrode parts 61 are partitioned with insulating slits 64 and opposed to the second metal layer 16 in the wound body 40.

The electrode part 62 is adjacent to the split electrode parts 61 across the insulating slits 64, and is not opposed to the second metal layer 16 in the wound body 40.

The fuse part 63 is a part connecting each of the split electrode parts 61 to the electrode part 62, and is narrower than the split electrode part 61 and the electrode part 62.

The electrode pattern of the first metal layer 15 including the fuse part may be, for example, an electrode pattern disclosed in JP 2004-363431 A or JP H05-251266 A, instead of the electrode pattern shown in FIG. 4. The same is true for the electrode pattern of the second metal layer 16 including the fuse part.

The first external electrode 41 is disposed on one end face of the wound body 40 and connected to the first metal layer 15 through contact with the exposed end of the first metal layer 15.

From the viewpoint of connectivity between the first metal layer 15 and the first external electrode 41, it is preferable that the first metallized film 11 protrude in the width direction W relative to the second metallized film 12 at one end face of the wound body 40.

The second external electrode 42 is disposed on another end face of the wound body 40 and connected to the second metal layer 16 through contact with the exposed end of the second metal layer 16.

From the viewpoint of connectivity between the second metal layer 16 and the second external electrode 42, it is preferable that the second metallized film 12 protrude in the width direction W relative to the first metallized film 11 at another end face of the wound body 40.

Examples of the material for constituting each of the first external electrode 41 and the second external electrode 42 include a metal such as zinc, aluminum, tin, and a zinc-aluminum alloy.

The first external electrode 41 and the second external electrode 42 are formed preferably by thermally spraying the metal described above on one end face and another end face of the wound body 40, respectively.

The constitution of the wound body 40 may be different from the constitution shown in FIG. 2. For example, in the first metallized film 11, the first metal layer 15 may be divided into two metal layers in the width direction W such that one metal layer reaches one side edge of the first dielectric film 13 and another metal layer reaches another side edge of the first dielectric film 13. In this case, in the first metal layer 15, one metal layer is connected to the first external electrode 41 and another metal layer is connected to the second external electrode 42, while the second metal layer 16 is disposed not to be connected to either the first external electrode 41 or the second external electrode 42. As a result, a capacitor can be formed by the first metal layer 15 and the second metal layer 16.

In the film capacitor of the present invention, the film of the present invention may be used as dielectric film.

The film of the present invention includes a cured product of a first organic material having a hydroxy group and a second organic material that is an aromatic compound having an isocyanate group, and includes a first main surface and a second main surface opposed to each other in a thickness direction.

Figure 5:
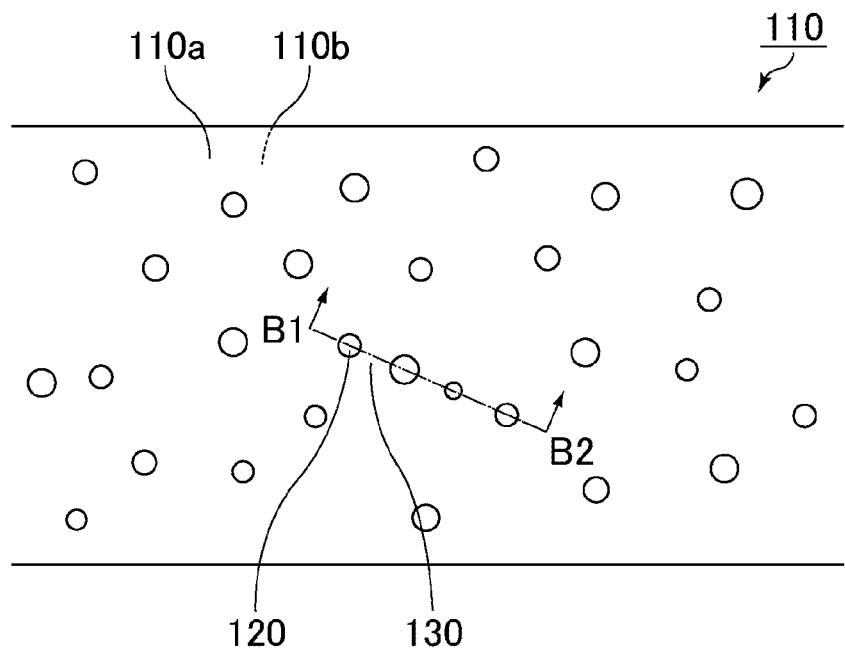
FIG. 5 is a schematic plan view showing an example of a film of the present invention.
Figure 6:
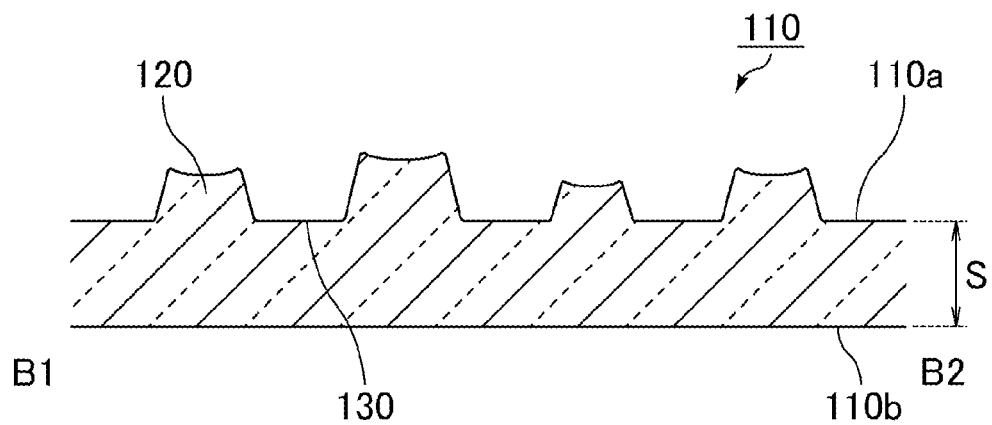
FIG. 6 is a schematic cross-sectional view showing a portion corresponding to a line segment B1-B2 in FIG. 5.

FIG. 5 is a schematic plan view showing an example of a film of the present invention. FIG. 6 is a schematic cross-sectional view showing a portion corresponding to a line segment B1-B2 in FIG. 5.

As shown in FIG. 5 and FIG. 6, a film (dielectric film) 110 includes a first main surface 110a and a second main surface 110b opposed to each other in the thickness direction.

The film 110 includes a cured product of a first organic material having a hydroxy group and a second organic material that is an aromatic compound having an isocyanate group. More specifically, the film 110 includes a cured product having a urethane bond obtained through a reaction between the hydroxy group (OH group) of the first organic material and the isocyanate group (NCO group) of the second organic material.

The presence of the urethane bond in the film can be checked by analysis using a Fourier transform infrared spectrometer (FT-IR).

It is preferable that the first organic material be a polyol having a plurality of hydroxy groups in a molecule.

Examples of the polyol include a polyvinyl acetal such as polyvinyl acetoacetal, a polyether polyol such as phenoxy resin, and a polyester polyol.

As the polyol, a phenoxy resin is preferred.

As the first organic material, a plurality of types of materials may be used in combination.

It can also be said that the second organic material is a so-called aromatic isocyanate which is an aromatic compound having an isocyanate group.

The second organic material functions as a curing agent for curing a resin solution in production of the film 110 by formation of a cross-linked structure through reaction with the hydroxy group of the first organic material.

It is preferable that the second organic material be a so-called aromatic polyisocyanate which is an aromatic compound having a plurality of isocyanate groups in a molecule.

Examples of the aromatic polyisocyanate include diphenylmethane diisocyanate (MDI) and tolylene diisocyanate (TDI). As the aromatic polyisocyanate, a modified product of these aromatic polyisocyanate may be used.

As the aromatic polyisocyanate, MDI is preferred. As the MDI, for example, a polymeric MDI or a monomeric MDI may be used.

As the second organic material, a plurality types of materials may be used in combination.

In the film capacitor 10 shown in FIG. 2, the film 110 may be used for both of the first dielectric film 13 and the second dielectric film 14, or may be used for any one of the first dielectric film 13 and the second dielectric film 14. In the case where the film 110 is used for both of the first dielectric film 13 and the second dielectric film 14, the compositions of the first dielectric film 13 and the second dielectric film 14 may be different from each other, though it is preferable that the compositions be the same.

The film 110 is produced by applying a resin solution containing the first organic material and the second organic material to the surface of a substrate, drying the applied solution, and then heating the applied solution to be cured. The resulting film 110 is peeled off from the substrate for use.

In the film of the present invention, the first main surface includes a plurality of protrusions having the second organic material.

In the film 110 shown in FIG. 5 and FIG. 6, the first main surface 110a includes a plurality of protrusions 120. Further, the first main surface 110a of the film 110 includes a flat part 130 including no protrusion 120.

The presence of the protrusions can be identified as black parts through observation of the first main surface of the film using a scanning electron microscope (SEM).

The protrusion 120 has the second organic material, i.e., an aromatic isocyanate. More specifically, the aromatic isocyanate which the protrusion 120 has derives from an aromatic isocyanate constituting the cured product which the film 110 includes.

Having an aromatic isocyanate, the protrusion 120 has a high hardness resulting from the aromatic ring of the aromatic isocyanate. Accordingly, in production of a film capacitor from the film 110, the protrusions 120 are hardly collapsed by winding of the film 110 or by pressing after winding, so that a gap is easily formed between the overlapping films 110. As a result, in dielectric breakdown, a decomposition gas from the film 110 easily scatters from inside the film capacitor, so that the film capacitor has excellent self-healing properties.

In contrast, in the case where the protrusion 120 has an aliphatic isocyanate, the protrusion 120 has a lower hardness in comparison with a case where the protrusion 120 has an aromatic isocyanate. Accordingly, in production of a film capacitor from the film 110, the protrusions 120 are easily collapsed by winding of the film 110 or by pressing after winding, so that a gap is hardly formed between the overlapping films 110. As a result, in dielectric breakdown, a decomposition gas from the film 110 hardly scatters from inside the film capacitor, so that the film capacitor has lowered self-healing properties.

Even with the protrusion 120 having an aromatic isocyanate, for example, in the case where a skewness of the first main surface 110a of the film 110 to be described below is less than 0.782, a gap is hardly formed between the overlapping films 110 in production of a film capacitor by winding the film 110, so that the film capacitor has lowered self-healing properties.

The presence of the aromatic isocyanate in the protrusion can be checked as described below. First, using a Fourier transform infrared spectrometer (FT-IR) "FT/IR-4100ST" manufactured by JASCO Corporation, an infrared absorption spectrum of the protrusion in a measurement wavenumber range of 500 $cm^{-1}$ to 4000 $cm^{-1}$ is measured by attenuated total reflection method (ATR). In the infrared absorption spectrum of the protrusion, confirmed detection of the absorption peak of an aromatic ring and the absorption peak of an isocyanate group allows to confirm the presence of an aromatic isocyanate in the protrusion. For example, in the case of using MDI as the aromatic isocyanate, the absorption peak of the aromatic ring is observed in a measurement wavenumber range of 1450 $cm^{-1}$ to 1550 $cm^{-1}$, and the absorption peak of the isocyanate group is observed in a measurement wavenumber range of 2200 $cm^{-1}$ to 2400 $cm^{-1}$ in the infrared absorption spectrum.

Further, by the same method, in the infrared absorption spectrum of the flat part, confirmed detection of the absorption peak of an aromatic ring and the absorption peak of an isocyanate group allows to confirm that the aromatic isocyanate which the protrusion has derives from the aromatic isocyanate constituting the cured product which the film includes.

In the film of the present invention, in an area range of 100 μm by 140 μm of the first main surface, a skewness of the first main surface is 0.782 to 14.3.

In the film 110 shown in FIG. 5 and FIG. 6, in an area range of 100 μm by 140 μm of the first main surface 110a, a skewness of the first main surface 110a is 0.782 to 14.3.

The skewness of the surface of the film is also referred to as surface height skewness Ssk (degree of deviation), which is an index representing symmetry of the height distribution of the surface of the film. The surface of the film has the following aspects depending on the range of Ssk.

Ssk>0: The surface of the film has many fine hills (protrusions).

Ssk=0: The surface of the film is symmetrical in the thickness direction.

Ssk<0: The surface of the film has many fine valleys (concaves).

In the film 110, the smaller the height of the protrusions 120 is, or the less the number of protrusions 120 is, the less the skewness of the first main surface 110a is. On the other hand, in the film 110, the larger the height of the protrusions 120 is, or the more the number of protrusions 120 is, the more the skewness of the first main surface 110a is.

In order to enhance the slidability for sliding the films 110 against each other, it is important to reduce the contact area between the films 110. From such a viewpoint, the first main surface 110a of the film 110 includes the plurality of the protrusions 120 so as to reduce the contact area between the films 110 when the films 110 are slid against each other. However, depending on the skewness of the first main surface 110a of the film 110, the compatibility between slidability and voltage resistance may not be achieved. In contrast, the skewness of the first main surface 110a of the film 110 being 0.782 to 14.3 in the area range described above of the first main surface 110a of the film 110 allows the film 110 to have excellent slidability and voltage resistance. Further, due to having excellent slidability, the film 110 is capable of imparting excellent pressing properties and self-healing properties when wound for constitution of a film capacitor.

In the case where the skewness of the first main surface 110a of the film 110 is less than 0.782, the contact area between the films 110 tends to be large in sliding the films 110 against each other, so that the slidability is lowered. In the case where the skewness of the first main surface 110a of the film 110 is more than 14.3, many places such as the protrusions 120 on which an electrical field tends to be concentrated are present, so that the voltage resistance is lowered.

In the case where the skewness of the first main surface 110a of the film 110 is 0.782 to 14.3 in the area range described above of the first main surface 110a of the film 110, the first main surface 110a of the film 110 may include a plurality of concaves in addition to the plurality of the protrusions 120.

The skewness of the first main surface of the film is determined as follows. First, using a laser microscope "VK-8700" manufactured by Keyence Corporation, the first main surface of the film is enlarged by 100 times to observe an area range of 100 µm by 140 µm. On this occasion, aluminum may be vapor deposited to a thickness of 10 nm on the first main surface of the film in advance. Then, the surface height skewness Ssk in the area range described above is measured using an analysis software "VK-analyzer" dedicated to the laser microscope "VK-8700" manufactured by Keyence Corporation, and the resulting measurement value is determined as the skewness of the first main surface of the film.

The planar shape of the protrusion 120 may be in a circular form as shown in FIG. 5, an ellipse form, or other forms.

The planar shapes of the protrusions 120 may be the same as or different from each other.

The cross-sectional shape of the protrusion 120 may be in a tapered form as shown in FIG. 6, or may be in a form other than the tapered form.

The cross-sectional shapes of the protrusions 120 may be the same as or different from each other.

It is preferable that the top face of the protrusion 120 be dented as shown in FIG. 6. In this case, the contact area between the protrusions 120 tends to be small when the films 110 are slid against each other, so that the slidability tends to be enhanced. The top face of the protrusion 120 needs not to be dented.

The tip of the protrusion 120 may be in a pointed form or in a round form.

The second main surface 110b of the film 110 may include no protrusion or may include a plurality of protrusions. In this case, it is preferable that, in an area range of 100 µm by 140 µm of the second main surface 110b of the film 110, a skewness of the second main surface 110b of the film 110 be 0.782 to 14.3. On this occasion, the second main surface 110b of the film 110 may include a plurality of concaves in addition to the plurality of the protrusions.

The skewness of the second main surface of the film is determined in the same manner as in the skewness of the first main surface of the film, except that the observation target is the second main surface of the film.

It is preferable that, in the film of the present invention, a coefficient of static friction on the first main surface side be 1.0 or less.

It is preferable that, in the film 110 shown in FIG. 5 and FIG. 6, a coefficient of static friction on the first main surface 110a side be 1.0 or less. In this case, the slidability of the film 110 is exceptionally good.

On the other hand, with a too small coefficient of static friction on the first main surface 110a side of the film 110, winding deviation of the film 110 towards width direction occurs during winding of the film 110 for production of a film capacitor, so that an external electrode may be hardly formed on the end face of the resulting wound body in a later step. From such a viewpoint, the coefficient of static friction on the first main surface 110a side of the film 110 is preferably 0.1 or more.

The coefficient of static friction of the film is determined as follows. First, two sheets of films are prepared as measurement specimens. Regarding both of the main surfaces of the measurement specimens, the main surface on the substrate side during production is defined as mold-release surface, and the main surface on the opposite side of the substrate is defined as drying surface. More specifically, regarding each of the measurement specimens, the drying surface corresponds to a first main surface and the mold-release surface corresponds to a second main surface. Further, it is preferable that the length direction of each of the measurement specimens be the same as the direction in which a tensile stress is applied to the film in the production step of a film capacitor, for example, the winding direction of the film. Subsequently, on the mold-release surface of one of the measurement specimens, a rectangular plate is fixed such that the drying surface is exposed. Further, on the drying surface of another one of the measurement specimens, a rectangular weight with a weight of 200 g is attached such that the mold-release surface is exposed. Then, the mold-release surface of the other measurement specimen with the drying surface to which the weight is attached comes into contact with the drying surface of the one measurement specimen with the mold-release surface to which the plate is fixed, such that the length directions thereof are parallel to each other. The weight attached to the drying surface of the other measurement specimen is pulled at a rate of 150 mm/minute in the length direction after fixation to a force gauge manufactured by Imada Inc. On this occasion, the maximum frictional force until occurrence of motion of the weight together with the other measurement specimen is read, and the static frictional coefficient is calculated from the read-out value.

It is preferable that the film 110 have a glass transition point of 130° C. or more. In this case, the film 110 has excellent heat resistance, so that the guaranteed temperature of a film capacitor made of the film 110 may be raised to, for example, 125° C. or more.

The glass transition point of the film is determined as follows. First, using a dynamic viscoelasticity measuring (DMA) apparatus "RSA-III" manufactured by TA Instruments Inc., the storage modulus and loss modulus of the film are measured while raising temperature from room temperature to 250° C. at a temperature rising rate of 10° C./minute under measurement conditions at a measurement frequency of 10 rad/second, and a strain of 0.1%. Temperature at which the loss tangent (tan 6) represented by loss modulus/storage modulus has a maximum peak value is defined as the glass transition point.

The thickness S of the film 110 is preferably 1 µm to 10 µm, more preferably 3 µm to 5 µm.

The thickness S of the film is a thickness determined at a position where the protrusion 120 is absent, as shown in FIG. 6.

The thickness of the film can be measured by using an optical film thickness meter.

The film of the present invention is made into a metallized film by providing at least the first main surface with a metal layer, so that the film capacitor of the present invention can be constituted.

Figure 7:
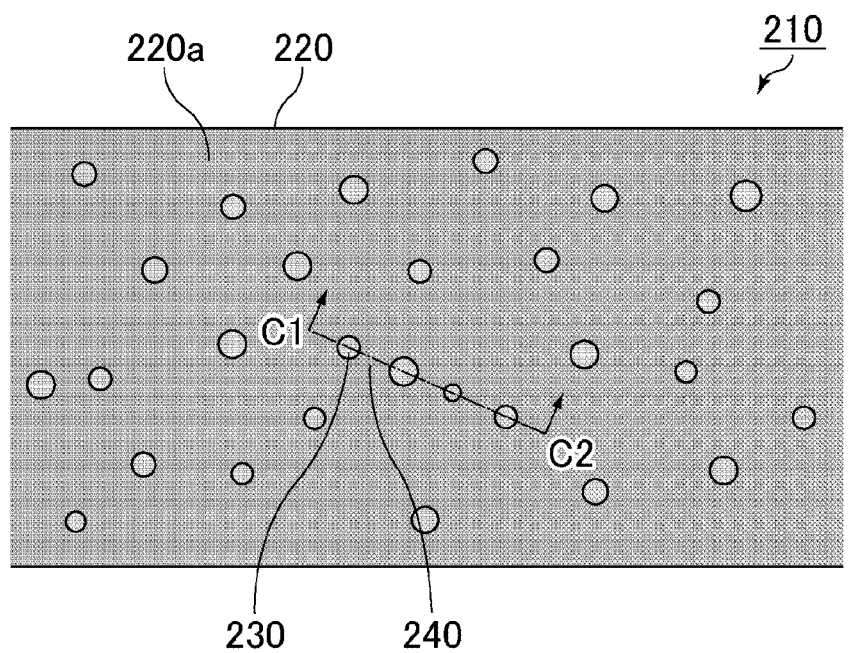
FIG. 7 is a schematic plan view showing an example of a metallized film to constitute the film capacitor of the present invention.
Figure 8:
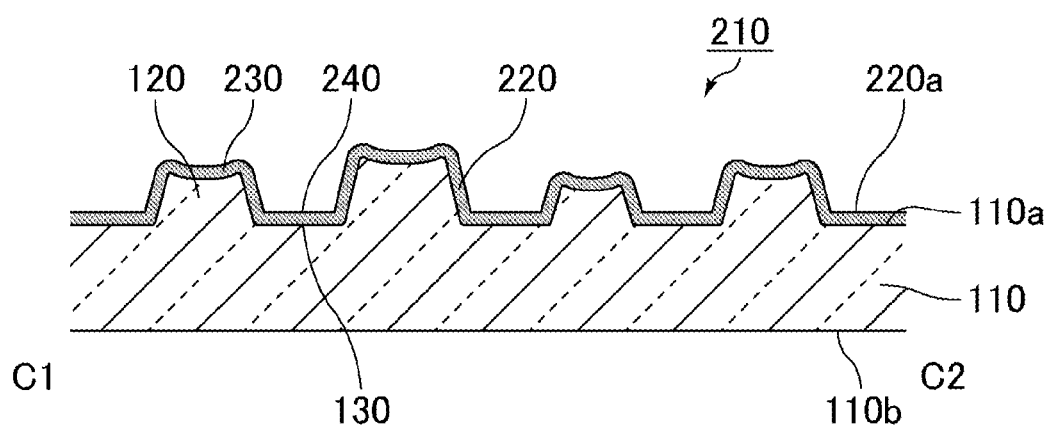
FIG. 8 is a schematic cross-sectional view showing a portion corresponding to a line segment C1-C2 in FIG. 7.

FIG. 7 is a schematic plan view showing an example of a metallized film to constitute the film capacitor of the present invention. FIG. 8 is a schematic cross-sectional view showing a portion corresponding to a line segment C1-C2 in FIG. 7.

As shown in FIG. 7 and FIG. 8, a metallized film 210 includes the film 110 shown in FIG. 5 and FIG. 6 and a metal layer 220 disposed on the first main surface 110*a* of the film 110.

In the film capacitor of the present invention, the first main surface of the dielectric film includes a plurality of protrusions having the second organic material.

In the film 110 shown in FIG. 8, in the same manner as in the film 110 shown in FIG. 5 and FIG. 6, the first main surface 110*a* includes a plurality of protrusions 120 having the second organic material, i.e., an aromatic isocyanate. Also, the first main surface 110*a* of the film 110 includes a flat part 130 including no protrusion 120.

Since the protrusion 120 has an aromatic isocyanate, the film capacitor made of the metallized film 210 including the metal layer 220 disposed on the first main surface 110*a* of the film 110 has excellent self-healing properties.

In the first aspect of the film capacitor of the present invention, in an area range of 100 μm by 140 μm of the first main surface of the dielectric film, a skewness of the first main surface of the dielectric film is 0.782 to 14.3. As described above, in the first aspect of the film capacitor of the present invention, attention is focused on the skewness of the first main surface of the dielectric film including the plurality of the protrusions.

In the film 110 shown in FIG. 8, as in the film 110 shown in FIG. 5 and FIG. 6, in an area range of 100 μm by 140 μm of the first main surface 110*a*, a skewness of the first main surface 110*a* is 0.782 to 14.3.

In the area range described above of the first main surface 110*a* of the film 110, the skewness of the first main surface 110*a* of the film 110 being 0.782 to 14.3 allows the film 110 to have excellent slidability and voltage resistance. Further, due to having excellent slidability, the film 110 is capable of imparting excellent pressing properties and self-healing properties when wound for constitution of a film capacitor.

In measurement of the skewness of the first main surface of the film in the film capacitor, the measurement is performed by the method described above for a region including no metal layer in the metallized film positioned at the outermost surface of the film capacitor. On this occasion, in the case there exists a masking oil attached to the surface in the measurement region, it is preferable that the measurement be performed after removal of the masking oil with a solvent such as hexane and toluene.

In the film capacitor of the present invention, the metallized film of the present invention may be used as metallized film.

The metallized film of the present invention includes: a film including a cured product of a first organic material having a hydroxy group and a second organic material that is an aromatic compound having an isocyanate group, and including a first main surface and a second main surface opposed to each other in a thickness direction; and a metal layer disposed at least on the first main surface of the film. Also, in the metallized film of the present invention, the first main surface of the film includes a plurality of protrusions having the second organic material. Further, in the metallized film of the present invention, a surface of the metal layer on an opposite side of the first main surface of the film includes a plurality of protruding parts coinciding with the plurality of the protrusions.

In the first aspect of the film capacitor of the present invention, it is preferable that a surface of the metal layer on an opposite side of the first main surface of the dielectric film includes a plurality of protruding parts coinciding with the plurality of the protrusions, in the same manner as in the second aspect of the film capacitor of the present invention to be described later.

In the first aspect of the film capacitor of the present invention, in the case where the surface of the metal layer includes the plurality of the protruding parts, it is preferable that, in an area range of 100 μm by 140 μm of the surface of the metal layer, a skewness of the surface of the metal layer be 0.562 to 13.9 in the same manner as in the second aspect of the film capacitor of the present invention to be described later.

In the second aspect of the film capacitor of the present invention, a surface of the metal layer on an opposite side of the first main surface of the dielectric film includes a plurality of protruding parts coinciding with the plurality of the protrusions.

In the metallized film 210 shown in FIG. 7 and FIG. 8, the metal layer 220 includes a surface 220*a* on the opposite side of the first main surface 110*a* of the film 110, with a plurality of protruding parts 230 coinciding with the protrusions 120. Further, the surface 220*a* of the metal layer 220 includes a flat part 240 including no protruding part 230.

The presence of the protruding part can be identified as a black part through observation of the surface of the metal layer using a scanning electron microscope.

In the metallized film of the present invention, in an area range of 100 μm by 140 μm of the surface of the metal layer, a skewness of the surface of the metal layer is 0.562 to 13.9.

In the second aspect of the film capacitor of the present invention, in an area range of 100 μm by 140 μm of the surface of the metal layer, a skewness of the surface of the metal layer is 0.562 to 13.9. As described above, in the second aspect of the film capacitor of the present invention, attention is focused on the skewness of the surface of the metal layer including the plurality of the protruding parts.

In the metallized film 210 shown in FIG. 7 and FIG. 8, in an area range of 100 μm by 140 μm of the surface 220*a* of the metal layer 220, a skewness of the surface 220*a* of the metal layer 220 is 0.562 to 13.9.

In the area range of the surface 220*a* of the metal layer 220, the skewness of the surface 220*a* of the metal layer 220 being 0.562 to 13.9 allows the metallized film 210 to have excellent slidability and voltage resistance. Further, due to having excellent slidability, the metallized film 210 is capable of imparting excellent pressing properties and self-healing properties when wound for constitution of a film capacitor.

When the skewness of the surface 220*a* of the metal layer 220 is less than 0.562, the contact area between the metallized films 210 tends to be large in sliding the metallized films 210 against each other, so that the slidability is lowered. When the skewness of the surface 220*a* of the metal layer 220 is more than 13.9, many places such as the protruding parts 230 on which an electrical field tends to be concentrated are present, so that the voltage resistance is lowered.

In the case where the skewness of the surface 220*a* of the metal layer 220 is 0.562 to 13.9 in the area range described above of the surface 220*a* of the metal layer 220, the surface 220*a* of the metal layer 220 may include a plurality of concaves in addition to the plurality of the protruding parts 230.

The skewness of the surface of the metal layer is determined in the same manner as the skewness of the first main surface of the film, except that the observation target is the surface of the metal layer.

In measurement of the skewness of the surface of the metal layer of a film capacitor, the measurement is performed for a specified region in the metallized film positioned at the outermost surface of the film capacitor.

In the case of the wound body 40 shown in FIG. 3, it is preferable that the measurement of the skewness of the surface of the second metal layer 16 be performed in a region L of the second metallized film 12 positioned at the outermost surface provided with the second metal layer 16, by the method described above. The region L of the second metallized film 12 is in a square shape having a length M both in the width direction W and the length direction (winding direction). Further, when a centerline Q passing through a center point P of an end side N of the second metallized film 12 and extending in the length direction is defined, a region L of the second metallized film 12 is linearly symmetrical with respect to the centerline Q in the width direction W. The length M of the region L of the second metallized film 12 is 10% of the length of the end side N of the second metallized film 12.

In the metallized film of the present invention, it is preferable that a coefficient of static friction on a side of the metal layer on the first main surface of the film be 1.4 or less.

In the first aspect of the film capacitor of the present invention, in the case where the surface of the metal layer includes the plurality of the protruding parts, it is preferable that a coefficient of static friction on a side of the metal layer on the first main surface of the dielectric film be 1.4 or less.

In the second aspect of the film capacitor of the present invention, it is preferable that a coefficient of static friction on a side of the metal layer on the first main surface of the dielectric film be 1.4 or less.

In the metallized film 210 shown in FIG. 7 and FIG. 8, it is preferable that a coefficient of static friction on the surface 220a side of the metal layer 220 be 1.4 or less. In this case, the slidability of the metallized film 210 is exceptionally good.

On the other hand, with a too small coefficient of static friction on the surface 220a side of the metal layer 220 in the metallized film 210, winding deviation of the metallized film 210 towards width direction occurs during winding of the metallized film 210 for production of a film capacitor, so that an external electrode may be hardly formed on the end face of the resulting wound body in a later step. From such a viewpoint, the coefficient of static friction on the surface 220a side of the metal layer 220 in the metallized film 210 is preferably 0.2 or more.

The coefficient of static friction of the metallized film is determined in the same manner as the coefficient of static friction of the film, except that a metallized film is used as measurement specimen.

Examples of the material to constitute the metal layer 220 include a metal such as aluminum, zinc, titanium, magnesium, tin and nickel.

The thickness of the metal layer 220 is preferably 5 nm to 40 nm.

The thickness of the metal layer can be specified through observation of the cross section of the metallized film in the thickness direction using a transmission electron microscope (TEM).

The film of the present invention may be produced, for example, by the following method.

Step of Preparing Resin Solution

A resin solution is prepared by mixing a first organic material having a hydroxy group and a second organic material that is an aromatic compound having an isocyanate group.

As the first organic material and the second organic material, ones described above are used.

In preparation of the resin solution, the first organic material and the second organic material may be diluted with a solvent. It is particularly preferable that the first organic material and the second organic material be diluted with a mixed solvent containing a first solvent selected from ketones and a second solvent selected from cyclic ether compounds.

Examples of the ketones from which the first solvent is selected include methyl ethyl ketone and diethyl ketone.

As the first solvent, a plurality of types of ketones may be used in combination.

Examples of the cyclic ether compounds from which the second solvent is selected include tetrahydrofuran and tetrahydropyran.

As the second solvent, a plurality of types of cyclic ether compounds may be used in combination.

It is preferable that as the solvent, a mixed solvent containing methyl ethyl ketone and tetrahydrofuran be used.

Drying and Curing Step of Resin Solution

First, the resin solution is applied to the surface of a substrate.

Examples of the substrate include a polyethylene terephthalate film and a polypropylene film.

Subsequently, the resulting coating film of the resin solution is dried in a drying furnace, and then cured through a heating treatment. A film is thus made on the surface of the substrate.

On this occasion, the coating film of the resin solution in the drying furnace is subject to the adjustment of drying temperature, drying time, air flow, etc., so that the second organic material, i.e., aromatic isocyanate, agglomerates on the drying surface as main surface of the coating film on the opposite side of the substrate. As a result, the agglomerates cause a plurality of protrusions, of which height, number, etc. are also subject to control. Thus, regarding the film state resulting from curing the coating film, in an area range of 100 μm by 140 μm of the first main surface corresponding to the drying surface, a skewness of the first main surface can be controlled to be 0.782 to 14.3.

It is preferable that the drying temperature of the coating film be adjusted in the range of 70° C. to 150° C.

The drying time of the coating film is adjustable through the transportation rate of the substrate with the coating film transported in a drying furnace. It is preferable that transportation rate be adjusted in the range of 100 m/minute to 160 m/minute.

The resulting film is peeled off from the substrate for use. As described above, the first main surface of the film corresponds to the drying surface as main surface of the coating film on the opposite side of the substrate. Also, the second main surface of the film corresponds to the mold-release surface of the coating film on the substrate side.

As described above, the film shown in FIG. 5 and FIG. 6 is prepared.

The metallized film of the present invention is produced, for example, by the following method.

Step of Preparing Metallized Film

First, as the first dielectric film and the second dielectric film, the film shown in FIG. 5 and FIG. 6 is prepared by the production method of the film of the present invention as described above.

Next, a metal is vapor deposited on the first main surface of the first dielectric film to form a first metal layer, so that a first metallized film is prepared. On this occasion, the first metal layer is formed such that the surface of the first metal layer on the opposite side of the first main surface of the first dielectric film includes a plurality of protruding parts coinciding with the protrusions of the first dielectric film. Further, in the width direction, the first metal layer is formed to reach one side end of the first dielectric film but not to reach another side end of the first dielectric film.

Also, a metal is vapor deposited on the first main surface of the second dielectric film to form a second metal layer, so that a second metallized film is prepared. On this occasion, the second metal layer is formed such that the surface of the second metal layer on the opposite side of the first main surface of the second dielectric film includes a plurality of protruding parts coinciding with the protrusions of the second dielectric film. Further, in the width direction, the second metal layer is formed not to reach one side end of the second dielectric film but to reach another side end of the second dielectric film.

By the present step, the metallized films shown in FIG. 7 and FIG. 8 are prepared as the first metallized film and the second metallized film.

The film capacitor of the present invention is produced, for example, by the following method.

Step of Preparing Wound Body

First, by the production method of the metallized film of the present invention described above, the metallized films shown in FIG. 7 and FIG. 8 are prepared as the first metallized film and the second metallized film.

Next, the first metallized film and the second metallized film are overlapped with a specified displacement distance in the width direction, and then wound to prepare a wound body. On an as needed basis, the resulting wound body may be interposed in the direction vertical to the width direction to be pressed into an elliptical cylindrical shape.

Step of Forming External Electrode

The first external electrode is formed to make a connection to the first metal layer by thermally spraying a metal on one end face of the wound body.

Also, the second external electrode is formed to make a connection to the second metal layer by thermally spraying a metal on another end surface of the wound body.

As described above, the film capacitor shown in FIG. 1 and in FIG. 2 is produced.

The film capacitor of the present invention is applicable to known uses, and appropriately used for power electronic equipment such as a motor-driven compressor/pump, a charger, a DC-DC converter, and a drive inverter, because the service life of the equipment used under an environment with large temperature changes at high temperature can be prolonged.

EXAMPLES

Examples are shown as follows to more specifically disclose the film capacitor of the present invention, the film of the present invention, and the metallized film of the present invention. The present invention is not limited to these Examples only.

Film specimens 1 to 5 were produced by the following method.

Step of Preparing Resin Solution

A phenoxy resin and MDI were diluted and mixed with a mixed solvent of methyl ethyl ketone and tetrahydrofuran to prepare a resin solution.

Drying and Curing Step of Resin Solution

First, the resin solution was applied to the surface of a polyethylene terephthalate film with a gravure coater.

Next, the resulting coating film of the resin solution was dried in a drying furnace, and then cured through a heating treatment for a specified time. Thereby, film specimens 1 to 5 having a thickness of 4.5 μm were prepared on the surface of the polyethylene terephthalate film.

On this occasion, the coating film of the resin solution was conditioned at a drying temperature in the range of 70° C. to 150° C., and at a transportation rate in the drying furnace in the range of 100 m/minute to 160 m/minute to control the formation state of the protrusions having MDI, the height of the protrusions, the number of the protrusions, etc., in the first main surface of each of the film specimens. Thereby, the skewness of the first main surface of the film specimen was made different among the film specimens 1 to 5.

The resulting film specimens 1 to 5 were then peeled off from the polyethylene terephthalate film.

Also, in the resin solution for use in production of the film specimens 1 to 5, hexamethylene diisocyanate (HDI) which is an aliphatic polyisocyanate was blended instead of MDI to produce a film specimen 6 in the same manner as in the film specimens 1 to 5.

Also, using the same resin solution for production of the film specimens 1 to 5, a film specimen 7 including no protrusion in the first main surface was produced. Further, a filler was further blended in the resin solution for use in production of the film specimen 7, and the blending ratio of the filler was changed to produce film specimens 8 to 10. The blending ratios of the filler relative to the total weight of the phenoxy resin and MDI were 1 wt % in the film specimen 8, 3 wt % in the film specimen 9, and 10 wt % in the film specimen 10, respectively. As the filler, acrylic beads "MP-1451" (average particle size: 0.15 μm) manufactured by Soken Chemical & Engineering Co., Ltd. was used.

Evaluation

It was confirmed that the protrusions of the film specimens 1 to 5 had MDI by the method described above. It was confirmed that the protrusions of the film specimen 6 had HDI. It was confirmed that the first main surface of the film specimen 7 included no protrusion. It was confirmed that the first main surface of the film specimens 8 to 10 were roughened with the filler.

Further, the film specimens 1 to 10 were subjected to the following evaluation. The results are shown in Table 1. The film specimens are simply written as "Specimen" in Table 1.

Skewness 1

The skewness of the first main surface of each of the film specimens 1 to 10 was measured by the method described above. In Table 1, the skewness in a film state is written as "Skewness 1".

Skewness 2

Also, aluminum was vapor deposited on the first main surface of each of the film specimens 1 to 10 to form a metal layer, so that a metallized film was prepared. The skewness of the surface of the metal layer of the resulting metallized film was measured by the method described above. In Table 1, the skewness in a metallized film state is written as "Skewness 2".

Glass Transition Point

The glass transition point of each of the film specimens 1 to 6 were measured by the method described above.

Coefficient of Static Friction 1

The coefficient of static friction of each of the film specimens 1 to 10 was measured by the method described above. In Table 1, the coefficient of static friction of the specimen in the film state is written as "Coefficient of static friction 1".

Coefficient of Static Friction 2

Aluminum was vapor deposited on the first main surface of the first main surface of each of the film specimens 1 to 10 to form a metal layer, so that a metallized film was prepared. The coefficient of static friction of the resulting metallized film was measured by the method described above. In Table 1, the coefficient of static friction of the specimen in the metallized film state is written as "Coefficient of static friction 2".

Dielectric Breakdown Voltage

First, a metal layer was formed on both main surfaces of each film specimens 1 to 10 by vapor deposition of aluminum to prepare a measurement specimen. On this occasion, the area of the region where the deposited metal layers on both of the main surfaces of film specimen overlapping to each other was set to 3 cm². For each of the film specimens 1 to 10, 16 each of the measurement specimens were prepared. Next, each of the electric field strengths was heled for 10 minutes with an increment of 25 V/µm for the 16 measurement specimens, and when 8 breakdown traces were generated in the film specimens, the electric field at that time was defined as failure voltage. The measurement temperature was set to 125° C. The failure voltages of the 16 measurement specimens were Weibull-plotted, and the value at which the failure frequency reached 50% in the Weibull distribution was defined as the dielectric breakdown voltage of the film specimen.

Pressing Property

First, aluminum was vapor deposited on the first main surface of each of the film specimens 1 to 10 to form a metal layer, so that a metallized film was prepared. On this occasion, a fluorine-based oil was applied to the first main surface of the film specimen in advance in order to draw a pattern on the metal layer. Next, the metallized film was cut to a specified width, and then the metallized film in a specified length was wound into a cylindrical shape to prepare a wound body. The wound body was then pressed with a pressure appropriately adjusted in the range of 10 N to 100 N depending on the size of the wound body, and then the pressing uniformity of the wound body was evaluated. As evaluation indexes, when the wound body was viewed from the width direction (refer to FIG. 3), the case where the film has no wrinkle/fold along the inside of the void at the center of the winding was evaluated as good, and the case where the film has wrinkles/folds along the inside of the void at the center of the winding was evaluated as poor.

Self-Healing Property

First, aluminum was vapor deposited on the first main surface of each of the film specimens 1 to 10 to form a metal layer, so that a metallized film was prepared. On this occasion, a fluorine-based oil was applied to the first main surface of the film specimen in advance in order to draw a pattern on the metal layer. Next, the metallized film was cut to a specified width and then the metallized film in a specified length was wound into a cylindrical shape to prepare a wound body. The external electrodes were formed by thermally spraying a metal on both end faces of the resulting wound body to produce a film capacitor. Then, while increasing the voltage applied to the resulting film capacitor gradually, evaluation whether the original applied voltage was recovered even after instantaneous decrease in the applied voltage due to dielectric breakdown was performed. As evaluation indexes, the case where the original applied voltage was recovered was evaluated as good, and the case where the original applied voltage was not recovered was evaluated as poor.

TABLE 1

| | Skewness 1 | Skewness 2 | Glass transition point (° C.) | Coefficient of static friction 1 | Coefficient of static friction 2 | Dielectric breakdown voltage (V/µm) | Pressing property | Self-healing property |
|---|---|---|---|---|---|---|---|---|
| Specimen 1 | 14.3 | 13.9 | 169 | 0.9 | 1.3 | 315 | Good | Good |
| Specimen 2 | 4.08 | 3.83 | 173 | 0.4 | 0.8 | 333 | Good | Good |
| Specimen 3 | 0.782 | 0.562 | 174 | 0.7 | 1.2 | 333 | Good | Good |
| *Specimen 4 | −0.302 | −0.253 | 168 | 1.6 | 2.2 | 350 | Poor | Poor |
| *Specimen 5 | 19.3 | 18.9 | 170 | 0.6 | 1.1 | 286 | Good | Good |
| *Specimen 6 | 2.32 | 2.17 | 105 | 0.8 | 1.2 | 350 | Good | Poor |
| *Specimen 7 | −0.181 | −0.147 | — | 7.3 | 9.0 | 385 | Poor | Poor |
| *Specimen 8 | 0.332 | 0.224 | — | 1.1 | 1.5 | 290 | Poor | Poor |
| *Specimen 9 | 0.789 | 0.623 | — | 1.0 | 1.4 | 254 | Good | Good |
| *Specimen 10 | 1.22 | 1.04 | — | 0.9 | 1.3 | 240 | Good | Good |

In Table 1, the specimen names marked with * represent comparative examples which are out of the scope of the present invention.

Thereby, in the film specimens 1 to 3, it was confirmed that the first main surface included protrusions having an aromatic isocyanate, and it was further confirmed that the skewness of the first main surface was 0.782 to 14.3. Also, in the metallized film state formed by vapor depositing a metal layer on the first main surface of the film specimens 1 to 3, it was confirmed that the skewness of the surface of the metal layer was 0.562 to 13.9. The film specimens 1 to 3 had excellent slidability and voltage resistance, and also were capable of imparting excellent pressing properties and self-healing properties to a film capacitor. More specifically, the film specimens 1 to 3 had exceptionally good slidability due to the low coefficient of static friction 1 and the low coefficient of static friction 2, and exceptionally good voltage resistance with a dielectric breakdown voltage of 300 V/µm or more, and further were capable of imparting excellent pressing properties and self-healing properties to a film capacitor. Further, the film specimens 1 to 3 had a glass transition point of 130° C. or more, with excellent heat resistance.

It was confirmed that the film specimen 4 included few protrusions in the first main surface, and the skewness of the first main surface was less than 0.782. Also, it was confirmed that in the metallized film state formed by vapor depositing a metal layer on the first main surface of the film specimen 4, the metal layer included few protruding parts in the surface, and the skewness of the surface of the metal layer was less than 0.562. As a result, the film specimen 4 had a coefficient of static friction 1 and a coefficient of static friction 2 higher than those of the film specimens 1 to 3, and was not capable of imparting excellent pressing properties and self-healing properties to a film capacitor.

It was confirmed that the film specimen 5 included a great number of protrusions in the first main surface, and the skewness of the first main surface was more than 14.3. Also, in the metallized film state formed by vapor depositing a metal layer on the first main surface of the film specimen 5, the surface of the metal layer included a great number of protruding parts, and the skewness of the surface of the metal layer was more than 13.9. As a result, the film specimen 5 had a lower dielectric breakdown voltage in comparison with the film specimens 1 to 3.

The film specimen 6 included a protrusion having an aliphatic isocyanate, and therefore was not capable of imparting excellent self-healing properties to a film capacitor.

The film specimen 7 included no protrusion. Also, in the metallized film state formed by vapor depositing a metal layer on the first main surface of the film specimen 7, there exists no protruding part. As a result, the film specimen 7 had a coefficient of static friction 1 and a coefficient of static friction 2 higher than those of the film specimens 1 to 3, and was not capable of imparting excellent pressing properties and self-healing properties to a film capacitor. In the film specimen 7, the first main surface was gradually concave on the whole, so that the skewness of the first main surface had a negative value. Also, in the metallized film state formed by vapor depositing a metal layer on the first main surface of the film specimen 7, the surface of the metal layer was gradually concave on the whole, so that the skewness of the surface of the metal layer had a negative value.

Due to a filler blended therein, the film specimens 8 to 10 had a lower dielectric breakdown voltage in comparison with the film specimens 1 to 3. Also, the film specimen 8 had a coefficient of static friction 1 and a coefficient of static friction 2 higher than those of the film specimens 1 to 3, and was not capable of imparting excellent pressing properties and self-healing properties to a film capacitor.

REFERENCE SIGNS LIST

10: Film capacitor
11: First metallized film
12: Second metallized film
13: First dielectric film
13a: First main surface of first dielectric film
13b: Second main surface of first dielectric film
14: Second dielectric film
14a: First main surface of second dielectric film
14b: Second main surface of second dielectric film
15: First metal layer
16: Second metal layer
40: Wound body
41: First external electrode
42: Second external electrode
61: Split electrode part
62: Electrode part
63: Fuse part
64: Insulating slit
110: Film (dielectric film)
110a: First main surface of film
110b: Second main surface of film
120: Protrusion of film
130: Flat part of film
210: Metallized film
220: Metal layer
220a: Surface of metal layer
230: Protruding part of metal layer
240: Flat part of metal layer
L: Region of second metallized film
M: Length of region of second metallized film
N: End side of second metallized film
P: Center point of end side of second metallized film
Q: Centerline
S: Thickness of film
T: Lamination direction
W: Width direction

The invention claimed is:

1. A film capacitor comprising:
a wound body in which a dielectric film and a metal layer are wound, the dielectric film including a cured product of a first organic material having a hydroxy group and a second organic material that is an aromatic compound having an isocyanate group, the dielectric film including a first main surface and a second main surface opposed to each other in a thickness direction, the metal layer being disposed at least on the first main surface of the dielectric film,
wherein the first main surface of the dielectric film includes a plurality of protrusions having the second organic material, and
in an area range of 100 μm by 140 μm of the first main surface of the dielectric film, a skewness of the first main surface of the dielectric film is 0.782 to 14.3.

2. The film capacitor according to claim 1, wherein a surface of the metal layer on an opposite side of the first main surface of the dielectric film includes a plurality of protruding parts coinciding with the plurality of the protrusions.

3. The film capacitor according to claim 2, wherein in an area range of 100 μm by 140 μm of the surface of the metal layer, a skewness of the surface of the metal layer is 0.562 to 13.9.

4. The film capacitor according to claim 2, wherein a coefficient of static friction on a side of the metal layer on the first main surface of the dielectric film is 1.4 or less.

5. The film capacitor according to claim 2, wherein a coefficient of static friction on a side of the metal layer on the first main surface of the dielectric film is 0.2 to 1.4.

6. The film capacitor according to claim 1, wherein the wound body has a flat cross section perpendicular to a scroll axis direction of the wound body.

7. A film capacitor comprising:
a wound body in which a dielectric film and a metal layer are wound, the dielectric film including a cured product of a first organic material having a hydroxy group and a second organic material that is an aromatic compound having an isocyanate group, the dielectric film including a first main surface and a second main surface opposed to each other in a thickness direction, the metal layer being disposed at least on the first main surface of the dielectric film,
wherein the first main surface of the dielectric film includes a plurality of protrusions having the second organic material,
a surface of the metal layer on an opposite side of the first main surface of the dielectric film includes a plurality of protruding parts coinciding with the plurality of the protrusions, and in an area range of 100 μm by 140 μm of the surface of the metal layer, a skewness of the surface of the metal layer is 0.562 to 13.9.

8. The film capacitor according to claim 7, wherein a coefficient of static friction on a side of the metal layer on the first main surface of the dielectric film is 1.4 or less.

9. The film capacitor according to claim 7, wherein a coefficient of static friction on a side of the metal layer on the first main surface of the dielectric film is 0.2 to 1.4.

10. The film capacitor according to claim 7, wherein the wound body has a flat cross section perpendicular to a scroll axis direction of the wound body.

11. A film comprising a cured product of a first organic material having a hydroxy group and a second organic material that is an aromatic compound having an isocyanate group, and including a first main surface and a second main surface opposed to each other in a thickness direction,
wherein the first main surface includes a plurality of protrusions having the second organic material, and
in an area range of 100 μm by 140 μm of the first main surface, a skewness of the first main surface is 0.782 to 14.3.

12. The film according to claim 11, wherein a coefficient of static friction on the first main surface side is 1.0 or less.

13. The film according to claim 11, wherein a coefficient of static friction on the first main surface side is 0.1 to 1.0.

14. A metallized film comprising:
a film including a cured product of a first organic material having a hydroxy group and a second organic material that is an aromatic compound having an isocyanate group, and including a first main surface and a second main surface opposed to each other in a thickness direction; and
a metal layer disposed at least on the first main surface of the film,
wherein the first main surface of the film includes a plurality of protrusions having the second organic material,
a surface of the metal layer on an opposite side of the first main surface of the film includes a plurality of protruding parts coinciding with the plurality of the protrusions, and
in an area range of 100 μm by 140 μm of the surface of the metal layer, a skewness of the surface of the metal layer is 0.562 to 13.9.

15. The metallized film according to claim 14, wherein a coefficient of static friction on a side of the metal layer on the first main surface of the film is 1.4 or less.

16. The metallized film according to claim 14, wherein a coefficient of static friction on a side of the metal layer on the first main surface of the dielectric film is 0.2 to 1.4.

* * * * *